United States Patent [19]

Allison et al.

[11] Patent Number: 5,317,237
[45] Date of Patent: May 31, 1994

[54] LOW VOLTAGE BALLAST CIRCUIT FOR A HIGH BRIGHTNESS DISCHARGE LIGHT SOURCE

[75] Inventors: Joseph M. Allison, Euclid; Raymond A. Buchina, Mentor; James D. Mieskowski, Seven Hills; Edward J. Thomas, Streetboro; John M. Davenport, Lyndhurst, all of Ohio

[73] Assignee: General Electric Company, Schenectady, N.Y.

[21] Appl. No.: 981,023

[22] Filed: Nov. 24, 1992

Related U.S. Application Data

[63] Continuation of Ser. No. 858,927, Mar. 27, 1992, abandoned.

[51] Int. Cl.5 .............................................. H05B 41/36
[52] U.S. Cl. ................................... 315/307; 315/291; 315/241 R
[58] Field of Search ................... 315/307, 241 R, 289, 315/290, 291, 209 R, DIG. 2, 225

[56] References Cited

U.S. PATENT DOCUMENTS 3,999,100  12/1976  Dendy et al. .................. 315/229
5,047,695   9/1991  Allen et al. ................... 315/224

Primary Examiner—Robert J. Pascal
Assistant Examiner—Tan Dinh
Attorney, Agent, or Firm—George E. Hawranko; Stanley C. Corwin

[57] ABSTRACT

A low voltage DC input ballast circuit for a discharge lamp particularly suitable for a central lighting system includes an input filter stage which feeds into a first boost converter circuit controlled by way of a pulse width modulator device. The first boost converter provides warm-up and steady state run signals to the lamp in a voltage fed manner over a coupling circuit using components which are reduced in size relative to conventional discharge ballast circuits. Control circuitry provides various monitoring functions, an example of which is that, in the event of a low input voltage, the lamp will operate in a dimmed or faded manner rather than maintain lumen output by drawing additional current. A second boost converter circuit is associated with a starter circuit arrangement and operates such that starting pulses can be generated and repeated if necessary in a very rapid manner.

13 Claims, 7 Drawing Sheets

LOW VOLTAGE BALLAST CIRCUIT FOR A HIGH BRIGHTNESS DISCHARGE LIGHT SOURCE

This is a continuation of application Ser. No. 07/858,927, filed Mar. 27, 1992 and now abandoned.

FIELD OF THE INVENTION

This invention relates to a low voltage DC ballast arrangement for a high brightness arc discharge light source. More particularly, this invention relates to such a ballast arrangement as can be realized using components that are reduced in size and number so as to be physically and operationally suitable for use with a small profile central lighting system employing a high brightness light source.

BACKGROUND OF THE INVENTION

With one aim of lamp and lighting designers being to achieve a high brightness light source which may be applied to an optical fiber light distribution scheme, there comes a commensurate need to develop a ballast arrangement which can efficiently power such a bright light source and can also exhibit advantages in the area of the size and cost considerations so as to be useful in limited space environments. The light source for a central lighting system which utilizes optical fibers for light transmission to various spaced apart locations must provide a high brightness output so as to insure that a sufficient amount of light output is available for coupling to the input face of the optical fibers. An example of such a high brightness light source can be found in U.S. Pat. No. 5,239,230, entitled "High Brightness Discharge Light Source" filed contemporaneously herewith in the name of Allen et al and which is assigned to the same assignee as the present invention. This application discusses a central lighting system which must provide the desired output in as small a space as possible. For instance, in an automotive application, the light source and the supporting circuitry to operate the light source must fit within a small area so as to insure aerodynamic advantages to the automotive designer. U.S. Pat. No. 4,958,263 issued to Davenport et al. on Sep. 18, 1990 and assigned to the same assignee as the present invention discusses an automotive application for a central lighting arrangement.

In addition to the size restrictions for a central lighting system and circuitry therefor as used in an automotive environment, it is necessary that such lighting system provide instantaneous light so that as the driver turns on the headlamps, light is instantaneously provided rather than after a warm-up period as in the case of the typical discharge light source. To this end, U.S. Pat. No. 5,059,865 issued to Bergman et al on Oct. 22, 1991 and issued to the same assignee as the present invention, illustrates the use of a xenon metal-halide lamp which provides instantaneous light output. It is required of the circuitry for such light source that the necessary energy to effect instantaneous light be provided; such required energy may be on the order of approximately 20 volts at 6 amps. Furthermore, in the event that the lamp is extinguished, the light output must be reestablished in a substantially instantaneous manner if desired. This restarting feature, typically referred to as a hot restrike operation, has been performed in the past using a conventional iron core transformer to achieve the high voltage input needed to restrike a discharge lamp that has not cooled from the previous on condition. It can be appreciated that in a central lighting system where it is desired to keep size requirements to a minimum, that a typical iron core transformer is both slow and oversized. Therefore, it would be advantageous for the ballast circuit for use with a discharge light source applied to a centralized lighting system, if such ballast had hot restrike capabilities that were achieved using components of a minimum size and wherein such components were capable of operating repeatedly in a rapid manner.

An example of a DC ballast arrangement for a xenon metal-halide lamp suitable for automotive applications can be found in U.S. Pat. No. 5,047,695 issued to Allen et al on Sep. 10, 1991 and assigned to the same assignee as the present invention. This patent discusses the adverse effects of cataphoresis to lamp operation when such lamp is disposed in a horizontal orientation. This patent presents a solution for avoiding such adverse effects by use of a ripple current imposed upon the operating signal which drives the lamp.

A central lighting system for an automotive application has a further requirement that, since the light source must operate from the automotive battery, in the event of a low voltage condition of the battery, the light source must not present a severe drain to the battery by drawing more current to maintain a constant level of light output. In such a low voltage condition, it would be advantageous of the light source ballast arrangement to sense the low voltage and then clamp the current at a fixed value such that the light output becomes dim providing an indication of the low voltage condition and also thereby preventing the more rapid discharge of the battery current. Though the conditions of preferred operation of the low voltage operation of the ballast circuit for a high brightness discharge light source have been described in relation to an automotive application, it can be appreciated that the principles of operation for such ballast arrangement apply in other environments as well such as in display lighting, lighting for medical instruments, and other lighting applications requiring a high brightness source in a small space.

SUMMARY OF THE INVENTION

The present invention provides a low voltage ballast arrangement for use with a high brightness discharge light source which can be implemented in a small space in order to achieve the size benefits typically expected of a centralized lighting scheme. The present invention also provides operational capabilities which allow for a hot restrike feature that can be applied on a repeated basis in a very rapid manner and further, where a warm-up timer can recognize immediately preceding conditions of lamp operation and provide an adjustment to gradually reduce lamp input current according to whether the lamp is to be cold started or requires a shorter restart time due to having only recently been extinguished.

In accordance with the principles of the present invention, there is provided a low voltage DC input ballast arrangement for a discharge light source which includes a power converter circuit having an input filter stage receptive of the low voltage DC input and effective for producing therefrom, a filtered DC signal. Of course, it can be appreciated that the present ballast circuit arrangement will work equally as well from an AC input power source provided proper rectification and voltage reduction techniques are utilized at the first and the filtered DC signal is coupled to the boost converter stage of power converter circuit from which is produced the run signal for operation of the discharge lamp. The run signal has a predetermined amplitude and frequency selected so as to operate the lamp during either a warm-up condition or a steady-state condition. The amplitude and frequency of the run signal are determined as a function of a control signal coupled to the boost converter stage of the power converter circuit. The control signal is generated within a control circuit arrangement as a function of sampled current and voltage operating characteristics of the lamp. The run signal output from the boost converter circuit is coupled to an output coupling circuit which is in turn connected to the discharge lamp in a manner so that the run signal is applied to the lamp in a voltage fed manner. A separate starting circuit enabled upon energization of the ballast circuit provides a high voltage pulse across the output coupling circuit of sufficient magnitude to cause ionization of the ingredients of the discharge lamp thus starting the discharge lamp. The starting circuit includes a second boost converter stage separate from that of the power converter circuit and is effective so that the high voltage pulse necessary for starting the discharge lamp can be generated and applied in a repetitive manner if necessary in a time period of less than 100 milliseconds from the occurrence of the previous high voltage starting pulse.

In a variation of this invention, the ballast circuit arrangement is provided with an auto-timer circuit as a part of the control circuit arrangement. The auto timer circuit is effective for sensing the period of time for which power to the discharge lamp has been removed and adjusting the run signal so as to achieve a warm-up power level to the lamp which is higher than the typical steady state run power. The auto-timer circuit adjusts the warm-up power level according to how long the power to the lamp has been off. The auto-timer circuit includes a time constant which is output coupled to a high impedance device so that the time constant discharges in an exponential manner even during power off conditions.

BRIEF DESCRIPTION OF THE DRAWINGS

In the following detailed description of the invention, reference will be made to the attached drawings in which.

DETAILED DESCRIPTION OF THE INVENTION

Figure 1:
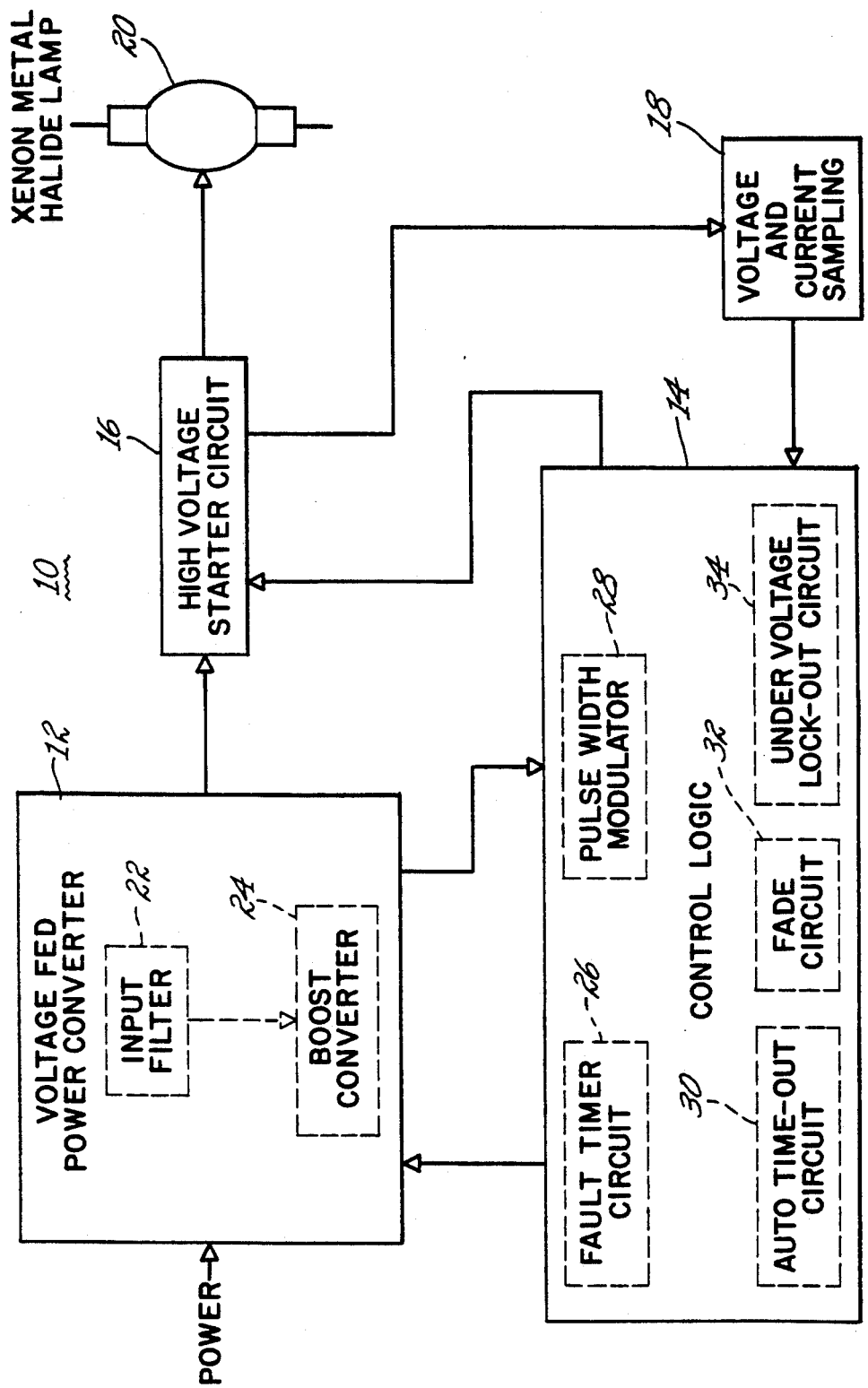
FIG. 1 is a block diagram representation of the low voltage DC input ballast arrangement for a discharge lamp constructed in accordance with the present invention.

As seen in FIG. 1, the low voltage DC input ballast circuit arrangement 10 for use with a discharge light source 20, which can be provided for example by means of the xenon metal halide discharge lamp disclosed in previously referenced U.S. Pat. No. 4,868,458, includes a voltage fed power converter portion 12, a control logic portion 14, a high voltage starter portion 16, and a sampling portion 18 for providing feedback to the control logic portion 14 as to the status of the operating characteristics of the discharge lamp 20.

The voltage fed power converter portion 12 includes an input filter circuit arrangement 22 shown representatively in block diagram form, and a boost converter circuit 24 which will be described later in further detail with reference to FIG. 2. The input filter circuit 22 receives the low voltage DC input and performs the necessary filtering operation in a conventional manner. Previously referenced U.S. Pat. No. 5,047,695 to Allen et al discloses the input filter stages of a DC ballast arrangement for a discharge lamp and is hereby incorporated by reference. Of course, it can be appreciated that for an automotive application, the power source would be provided by a 12 volt DC battery, however, the present invention works equally as well in other applications such as for display lighting wherein the power can be provided by means of a DC power supply (not shown). The boost converter circuit 24 operates to generate the warm-up and run signals for the discharge lamp 20. Under normal or steady state operating conditions, the boost converter 24 operates at about 55 Khz and is effective for providing a run signal with a duty cycle of 80% for the 50 volt, 1.2 amp load of the discharge lamp 20. During warm-up conditions, the boost converter circuit 24 provides a warm-up signal into the load of approximately 20 volts and 6 amps for which the duty cycle will typically be about 50%

The operation of the boost converter circuit 24 during either the warm-up or steady state operating conditions occurs under the control of a gate signal originating at the control logic circuit 14. Specifically, a pulse width modulator circuit 28 generates the gate signal after monitoring or sensing various operating characteristics of the lamp 20. The voltage and current sampling circuit 18 provides the measure in time of the voltage and current operating values of the lamp 20 from which various circuits associated with the control logic circuit 14 perform specific timing and magnitude measurement checks.

One check performed at the control logic circuit 14 is in the nature of a general fault check performed by the fault timer circuit 26. The fault timer circuit 26 is effective for monitoring general operating conditions of the ballast circuit 10 and the lamp 20 and shutting the ballast circuit 10 down in the event that a system type fault is detected. For instance, the fault timer circuit 26 will determine if ionization of the lamp ingredients has occurred within a specific period of timing following a start operation and, if ionization has not occurred, will result in the disabling of the gate signal from the pulse width modulator 28 to the boost converter 24 effectively shutting down the lamp 20 and ballast circuit 10 arrangement.

The control logic circuit 14 includes a second checking operation performed by the auto time-out circuit 30. Because the operation of a metal halide lamp involves the need to provide a starting signal of sufficiently high magnitude to initiate ionization of the lamp ingredients, followed by a warm-up signal having lower voltage but higher current characteristics which exponentially decrease to the steady state run condition previously discussed as being approximately 50 volts into a 1.2 amp load, it is necessary to monitor the period of time for which power has been removed from the lamp in order to more efficiently re-power the lamp following a period during which the lamp has only been extinguished for a short duration. The auto time-out circuit 30 provides for a cold start of approximately 5 minutes with a gradually decreasing warm-up current for shorter restart times thus providing a constant light output. Previous time out circuits for metal halide lamps have included timers to perform this type of function but have been unsuccessful in maintaining the operation during power off conditions since, under such conditions, the timers have prematurely discharged prior to actually timing out.

A fade circuit 32 is also included as a part of the control logic circuit for the purpose of monitoring the level of voltage available to the boost converter 24. The fade circuit 32 is effective such that, should the input voltage decrease below its nominal value, rather than the ballast circuit 10 increasing the current load on the source so as to maintain a constant lamp output and thereby causing a drain on the system power source (i.e. automotive battery), the input current is clamped to a constant value and the light output is permitted to fade due to the lower input voltage. This feature provides the system benefit not only of protecting against the burning out of the ballast circuit, but also that the efficiency of operation is not sacrificed by the drain of a higher current which results in more heat generation due to $i^2R$ losses. Since the current would increase exponentially as the voltage drops, avoidance of such current drain results in a more efficient ballast operation although with a dimmer light output. In this instance, the fade circuit 32 may allow for the early indication that a problem may exist in the input power circuit by virtue of the light output being dimmed.

An under voltage lockout circuit (UVLO) 34 associated with the control logic circuit 14, performs a similar function as the fade circuit 32 except that the lockout circuit 34, once the input voltage has dropped below a predetermined threshold value, will prevent re-initiation of the lamp discharge until such time as the input voltage has returned to its original nominal value and not merely some incremental increase relative to the threshold lockout value. Such a lockout feature is effective for preventing repeated restarting and shutdown of a pulse width modulator (PWM) device associated with the first boost converter 24. The PWM has an internal lockout feature with a small hysteresis characteristic that, should the battery continue to rebound between an acceptable voltage and a voltage below the PWM lockout, the PWM device would repeatedly attempt to restart to normal operating conditions. UVLO 34 of the present invention prevents operation of the ballast circuit until source power is confidently restored. In this manner, the lockout circuit 34 is effective for preventing repeated attempts to re-ignite the discharge in a situation where the input voltage is fluctuating around a value close to the predetermined threshold lockout value.

The condition monitoring circuits of the control logic circuit 14 provide control of second boost converter circuit (see FIG. 7) associated with the high voltage starter circuit 16. The high voltage starter circuit 16, to be described later in detail with reference to FIG. 7, performs the function of developing the high voltage pulse that is necessary to cause a breakdown of the ingredients of the discharge lamp 20 so as to start ionization. The construction of the high voltage starter circuit 16 is such that the run signal to the discharge lamp 20 is coupled as a voltage fed rather than a current fed signal. In this manner, it can be appreciated that the high voltage starter circuit 16 can utilize an inductor at the lamp coupling stage that is of a significantly smaller inductance than would otherwise be expected of a current fed arrangement for coupling the run signal to the lamp 20.

A preferred embodiment of the ballast circuit 10 of the present invention is illustrated schematically in FIGS. 2 through 7 in which are included various circuit components of a typical value or of a type as set forth in the following Table 1. Unless indicated otherwise, resistors are shown in terms of ohms and capacitors are shown in terms of microfarads.

TABLE 1

| Component | Values | Type |
|---|---|---|
| C1 | .01, 100 V | |
| Q1 | FET, 250 Volt | Motorola IRFP250 |
| D1, D2 | 400 Volt Diode | Motorola MUR1540 |
| L1 | Center Tapped Inductor | 25 T Pri, 25 T Sec |
| R1, R50, R53 | 10K, ¼ W | |
| R2 | 0.02, 3 W | |
| R3 | 100, ¼ W | |
| R4 | 511K, ¼ W | |
| R5 | 887K, ¼ W | |
| R6 | 100, 3 W | |
| C2 | 500 pf, 1 KV | |
| C3, C4 | 1.0, 400 V | |
| C5 | 4.7, 350 V | |
| C6 | 0.1, 100 V | |
| C7 | 0.0022, 50 V | |
| C8, C21 | 0.022, 50 V | |
| C9, C11, C12, C14 | 0.1, 50 V | |
| C10, C13, C23 | 0.01, 100 V | |
| R7, R11, R44, R46 | 2.74K, ¼ W | |
| R8 | 39.2K, ¼ W | |
| R9 | 5.76K, ¼ W | |
| R10 | 14.3K, 1/10 W | |
| R12 | 4.75K, 1/10 W | |
| R13 | 47.5K, ¼ W | |
| R14 | 27.4K, ¼ W | |
| Q2 | sot-23 | Motorola MMBT 2222L |
| U101, U102 | PWM | Cherry CS-2841B |
| R15 | 0.15, 3 W | |
| R16 | 200K, 1/10 W | |
| R17, R18, R21 | 15K, ¼ W | |
| R19, R30, R38, R39 | 909, 1/10 W | |
| R20, R23, R27, R32 | 6.81K, 1/10 W | |
| R22, R28, R43, R47 | 15K, ¼ W | |
| D3 | 5.1 V, 250 mW Zener | Motorola MLL4689 |
| U1, U2, U3, U12 | Quad Comparator | Motorola LM239M |
| U4, U5, U6, U7 | Quad OP-AMP | Motorola LM324AM |
| D4, D5, D7–D10 | LL34 Mini Melf | FDLL4148.tr |
| C15, C19 | 22, 16 V | |
| C16 | 0.1, 100 V | |
| R24, R31 | 174K, 1/10 W | |
| R25 | 3.2M, ¼ W | |
| R26, R29, R42 | 5.11K, 1/10 W | |
| R33 | 2.1K, 1/10 W | |
| R34 | 1K Potent. | |
| R35 | 10.5K, 1/10 W | |
| R36 | 11K, 1/10 W | |
| R37 | 33.2K, 1/10 W | |

TABLE 1-continued

| Component | Values | Type |
|---|---|---|
| R40 | 16.5K, ⅛ W | |
| R41 | 23.7K, ⅛ W | |
| R45 | 100K, 1/10 W | |
| C17, C20 | 0.1, 50 V | |
| C18 | 220 pf, 100 V | |
| U8, U9, U10, U11 | Quad Comparator | Motorola LM239M |
| Q3 | 200 V FET | Motorola IRF630 |
| T101 | HV Fly Back XFRMR | |
| T102 | HV Pulse Out XFRMR | |
| C22 | 470 pf, 50 V | |
| C24 | 1.0, 50 V | |
| C25, C26 | .047, 630 V | |
| D11 | 15 V Zener | Motorola MLL5245 |
| D12 | 3 KV, .5A | EDI RUSH103 |
| R48 | 7.5K, ⅛ W | |
| R49 | 20, 1/10 W | |
| R51 | 1.21K, ⅛ W | |
| R52 | 0.2, 0.7 W | |

Figure 2:
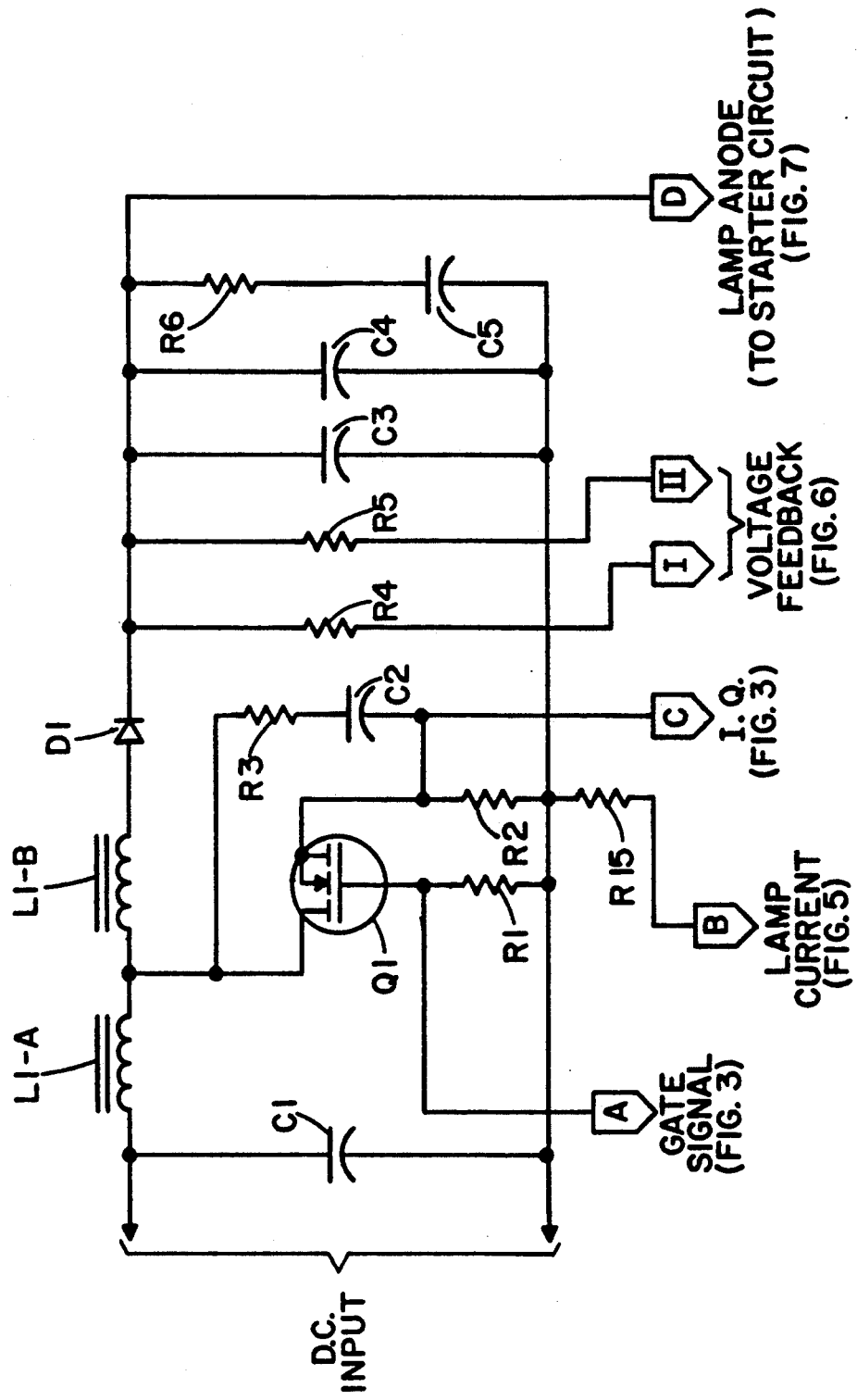
FIG. 2 is a schematic illustration of the boost converter stage of the power converter circuit portion of the ballast arrangement of the present invention.

The primary boost converter circuit 24 illustrated in FIG. 2 includes inductor L1 which is center-tapped to provide an optimum voltage and current operating region for the power switching transistor Q1. The boost converter circuit 24 further includes diode D1 and capacitors C3 and C4. The run signal controlled by transistor Q1 is coupled to the lamp anode via the path formed by diode D1, resistor R6 and capacitor C5. Resistor R2 coupled to the source terminal of transistor Q1 provides a path to the control logic circuit by which an indication of the transistor Q1 current is derived. Resistor R15 by virtue of its connection to the lamp cathode, provides a means to measure the current flow through the discharge lamp 20. As further illustrated in association with the boost converter circuit 24 of FIG. 2, resistors R4 and R5 form part of the voltage and current sampling circuit 18 of FIG. 1 and provide a measure of the voltage conditions relating to the operating conditions of the lamp 20. Specifically, the path formed by resistor R4 provides and indication of the operating voltage of the lamp 20 while the path formed by resistor R5 provides an indication of the open circuit voltage.

Figure 3:
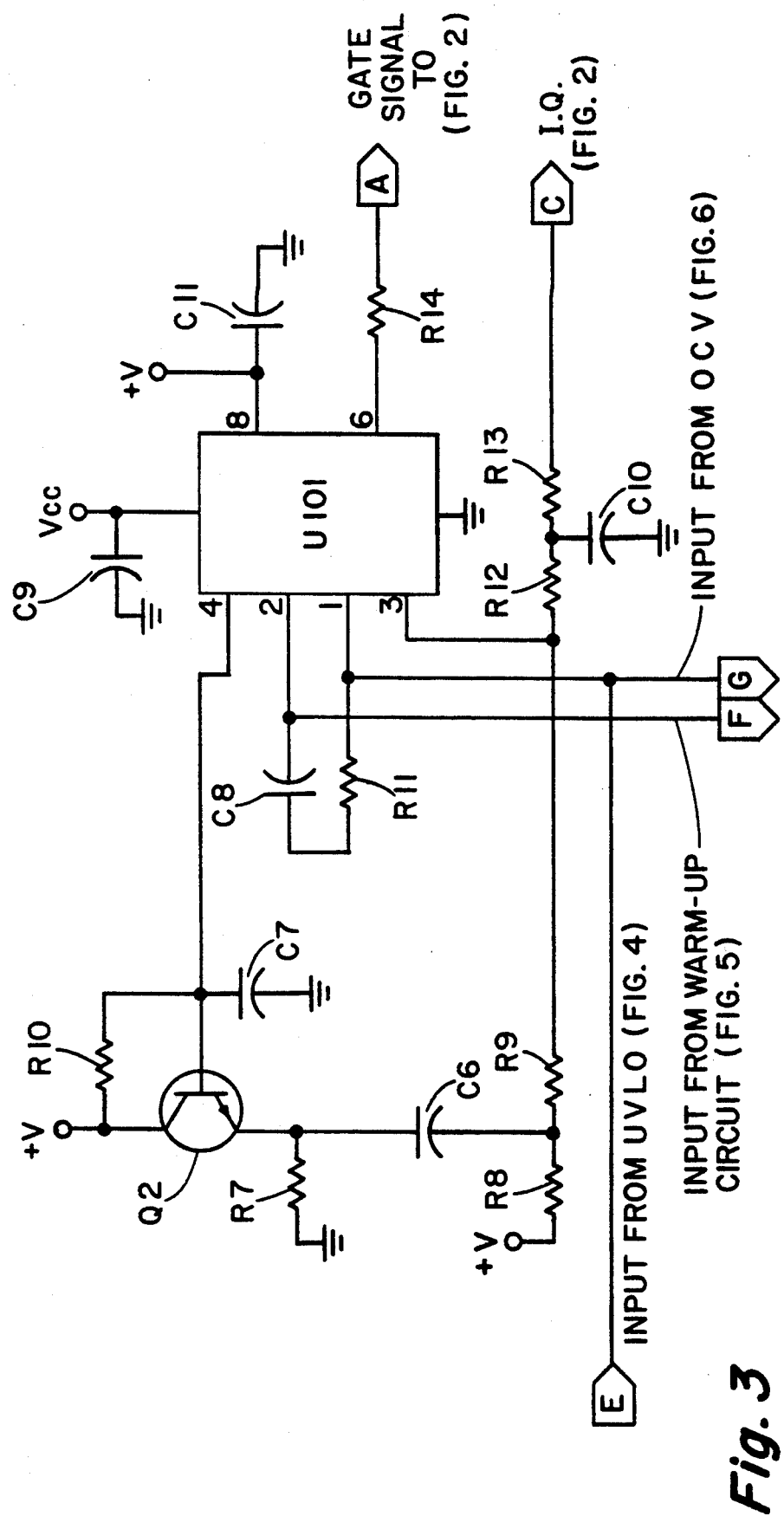
FIG. 3 is a schematic illustration of the under voltage lockout circuit associated with the control logic portion of the ballast arrangement of the present invention.
Figure 6:
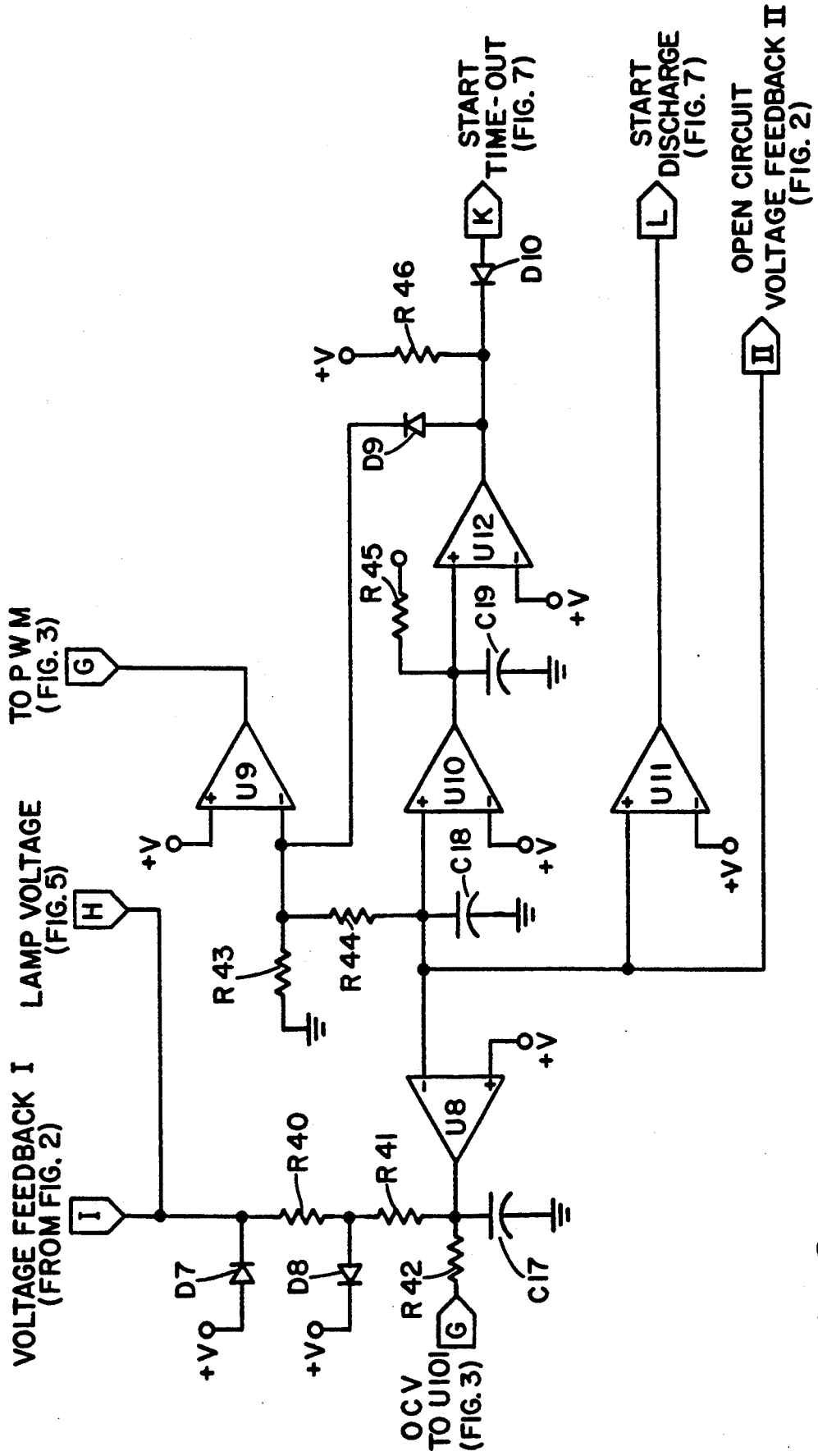
FIG. 6 is a schematic illustration of the fault timer circuit associated with the control logic portion of the ballast arrangement of the present invention.

The pulse width modulator circuit 28 which controls the operation of the boost converter circuit of FIG. 2 includes a pulse width modulator (PWM) device U101 as shown in FIG. 3. The PWM device U101 is operated to the previously stated frequency of approximately 55 Khz by means of the input to its pin 4 provided by the circuit arrangement comprising transistor Q2, resistor R10 and capacitor C7. Lamp operating conditions are provided to the PWM device U101 by means of resistors R4 and R15 shown in FIG. 2 which comprise the voltage and current sampling circuit 16 represented in FIG. 1. Sampling resistor R15 shown in FIG. 2 provides a measure of lamp current which is input to pin 2 of the PWM device U101 whereas resistor R4 shown in FIG. 2, along with the resistor network comprising resistors R40, R41, and R42 shown in FIG. 6, provide a measure of lamp volts to the PWM device U101.

In addition to the sensed current and voltage operating characteristics of the lamp 20 which are input to the PWM device U101 at pin 2, this input line also serves as a summing node for various other sensed operating conditions such as the fault timer, fade circuit and auto-timer/warm-up circuit shown in FIGS. 4 through 6 and which will be described later in further detail. A measure of the current flow (IQ) in the power switching transistor Q1 of the boost converter circuit 24 is also input to the PWM device U101 at pin 3 thereof so that, in the event excessive current flow in the power switching transistor Q1 is detected, the PWM device U101 can be interrupted before damage can occur to the ballast circuit 10. Given that all input conditions are detected as being within the predetermined acceptable ranges, the PWM device U101 will output the gating signal to the boost converter circuit of FIG. 2 over its output pin 6 and resistor R14.

Figure 4:
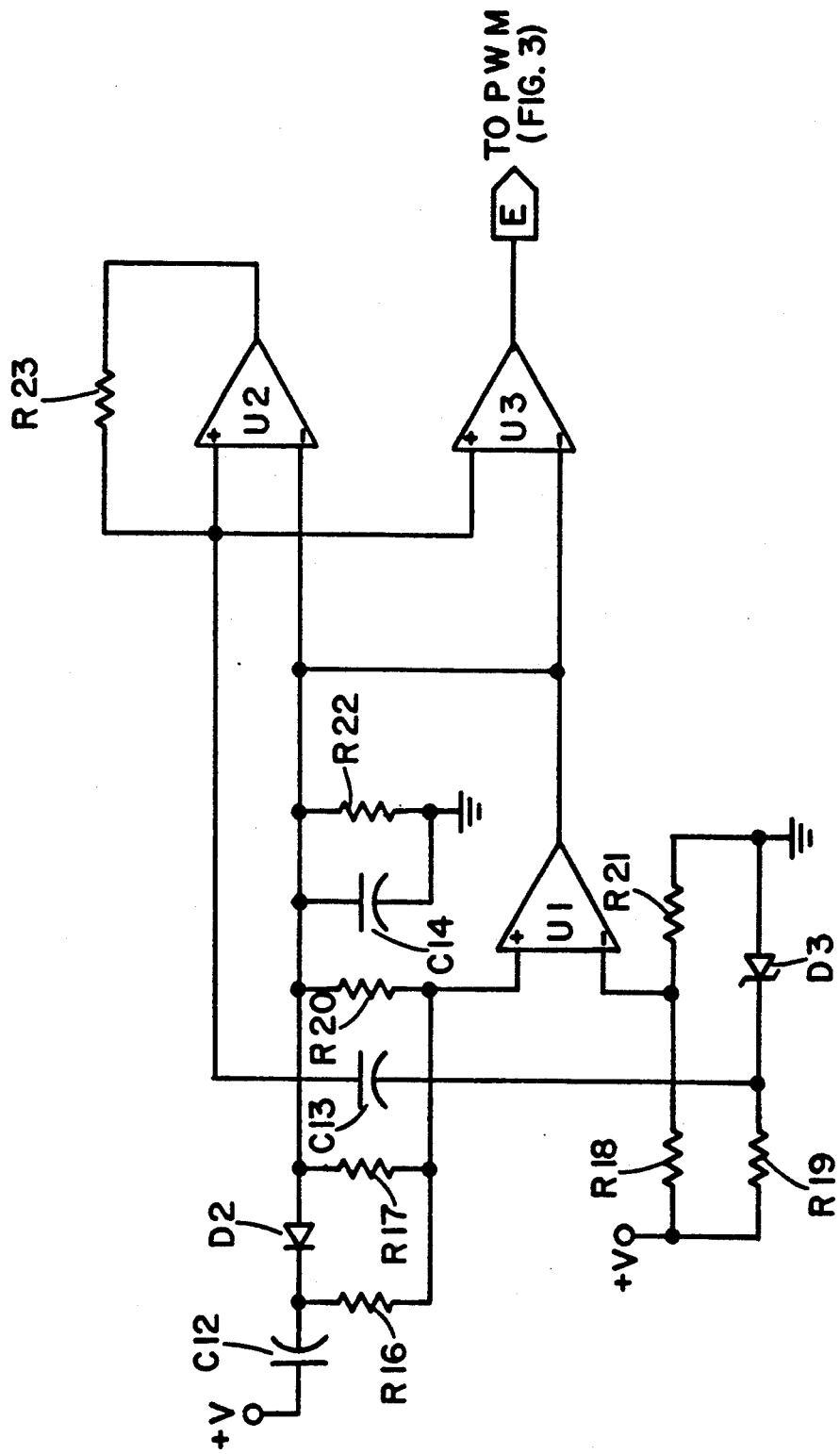
FIG. 4 is a schematic illustration of the pulse width modulator circuit associated with the control logic portion of the ballast arrangement of the present invention.

One of the control signals coupled to the input line feeding into pin 2 of the PWM device U101 originates from the under voltage lock-out (UVLO) circuit shown in FIG. 4. The UVLO circuit has as its input thereto, a sample of the low voltage DC input to the ballast circuit 10. This DC input can typically be on the order of between 10 to 18 volts and most likely is 12 volts as in the instance of an automotive application. A comparator network having first, second and third comparator devices U1, U2 and U3 constantly samples the +V input to insure that such input has not dropped below a predetermined value which, for the example of the nominal 10 to 18 volt input range of the present invention, can be on the order of approximately 9 volts. Of course, it is understood that such a selection is somewhat arbitrary and could have been set at a higher or lower value without departing from the scope of the present invention. The comparator network of devices U1, U2 and U3 has also been configured so that, once a low input threshold value has been crossed, the PWM device U101 of FIG. 3 will be disabled until such time as the input power has been restored to its nominal value. In other words, if the UVLO circuit has detected a low threshold value of 9 volts for instance, comparator U3 will output a signal to the PWM device U101 disabling such device until the input voltage has been restored to approximately 12 volts. In this manner, the UVLO circuit will insure that the ballast circuit 10 does not resume operation until there is a reasonable assurance that the input power is dependably restored.

Figure 5:
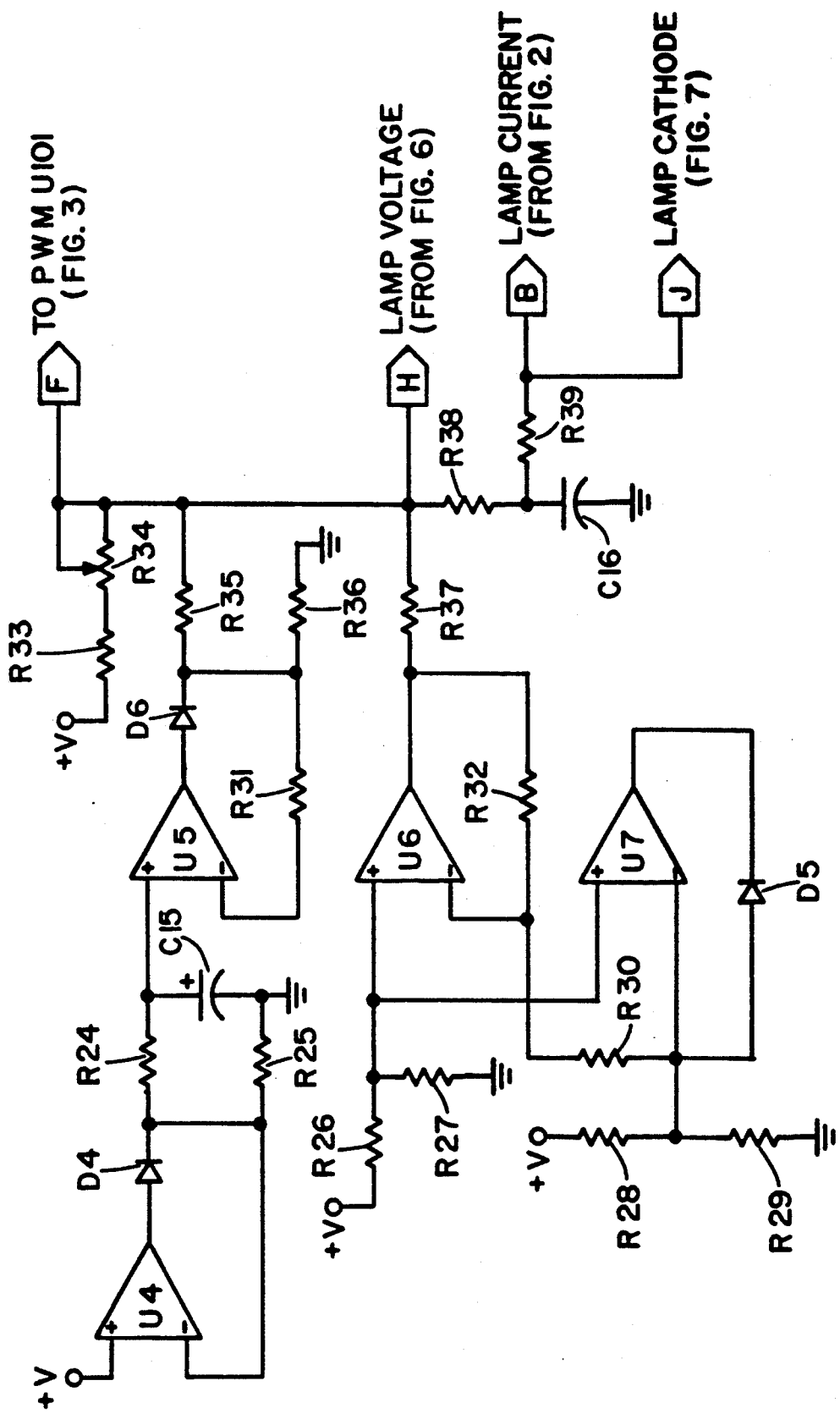
FIG. 5 is a schematic illustration of the warm-up timer circuit associated with the control logic portion of the ballast arrangement of the present invention.

FIG. 5 illustrates two additional performance monitoring circuits that are connected to the input line which feeds into pin 2 of the PWM device U101. One of these monitoring circuits, a warm-up timer circuit, includes op-amp circuits U4 and U5 and is effective for providing a higher than normal exponentially decreasing warm-up power to the lamp 20. The warm-up timer circuit provides for a dual time constant, a warm-up timer constant and a cool down time constant. The warm-up time constant consists of op-amp circuits U4 and U5 and uses a charging timing circuit made up of capacitor C15 and resistor R24. The timing circuit C15, R24 charges to the level of the source voltage (+V) in approximately 4 time constants and is connected to the positive reference input of op-amp U5. The output of op-amp U5 is coupled back into the summing node which is fed into pin 2 of PWM device U101 and is effective for controlling the boost converter 24 operation such that lamp current is adjusted to match the status of the warm-up timer circuit. In other words, the output of the warm-up timer op-amp U5 provides an exponential ramping reference for the current control loop during warm-up conditions. The warm-up timer is selected to time out or discharge at approximately 5 minutes following removal of the source voltage and is accomplished via the path formed by C15, R25 and R24. Following the warm-up time, the lamp 20 will operate in the steady state conditions previously noted as being approximately at 50 volts into a 1.2 amp load. The cool down timer portion of the warm-up timer provides somewhat of a historical measure of the operation of the lamp in that, should the power be restored prior to the expiration of the warm-up timer time circuit, the magnitude of the warm-up power to the lamp 20 will be exponentially reduced according to the point in time relative to the warm-up time that the power has been restored. The control of the warm-up power to the lamp 20 is achieved through coupling the output of comparator U5 through resistor R35 which is then connected to the input line to the PWM device U101. It should be noted that the input reference for comparator U5 is a high impedance input so that, in the event that power is lost to the ballast circuit 10, the charge on capacitor C15 will not be prematurely drained. In this manner, it can be appreciated that the timing circuit C15, R24 associated with the warm-up timer circuit will discharge in its normal 5 minute time period rather than more quickly as can occur in the instance where a static clamp diode and/or other low impedance device is disposed in the circuit path of the timing circuit.

The second operational monitoring circuit illustrated in FIG. 5 is a fade circuit consisting primarily of comparator circuits U6 and U7. The fade circuit monitors the source voltage on its positive reference terminals and the lamp voltage on the negative reference terminals of comparators U6 and U7 and provides an output to the input line to the PWM device U101 via resistor R37. The fade circuit is effective for insuring that in the event that source voltage drops below its nominal value, for instance, 12 volts in an automotive application, the ballast circuit 10 does not draw additional current so as to maintain constant lamp power. In a typical ballasted metal halide lamp, when there is a drop in supply voltage, the ballast will draw more current to maintain constant lamp power; such current drain has the adverse affect of more quickly draining the power source if such source is a battery as in the case of an automotive application. The present invention, by provision of the fade circuit shown in FIG. 5, insures that upon detecting a drop in the source voltage, the ballast input current is maintained to a substantially constant level. The effect is to have a lamp output which has faded due to the reduced power level of operation.

FIG. 6 illustrates various other performance monitoring circuits including a fault timer circuit configured around comparators U10 and U12 as well as a circuit for monitoring the open circuit voltage which is configured around comparators U8, U9, and U11. Regarding the fault timer circuit, a start time-out signal output from comparator U12 is coupled to the starter circuit and is effective for controlling operation of the boost converter arrangement associated with the starter circuit. This output of comparator U12 serves to shut down the operation of the starter circuit in the event that such starter has failed to start the lamp after a predetermined period of time.

The open circuit voltage check performed by comparators U8, U9 and U11 is effective for insuring that the open circuit voltage of the ballast circuit 10 does not exceed a predetermined value. By comparing a divided down value of the open circuit voltage to a +5 volt reference, comparator U9 can output a low signal to pin 1 of the PWM device U101 effectively preventing further increases in the open circuit voltage of the ballast circuit by stopping the output of pulses from the PWM device U101 when the upper limit of the open circuit voltage has been detected. The open circuit voltage is also effective for generating the start discharge signal which is coupled from the output of comparator U11 to the starter circuit of FIG. 7. The start discharge signal is effective for disabling the starter circuit once it has been determined that a lamp discharge has occurred.

Figure 7:
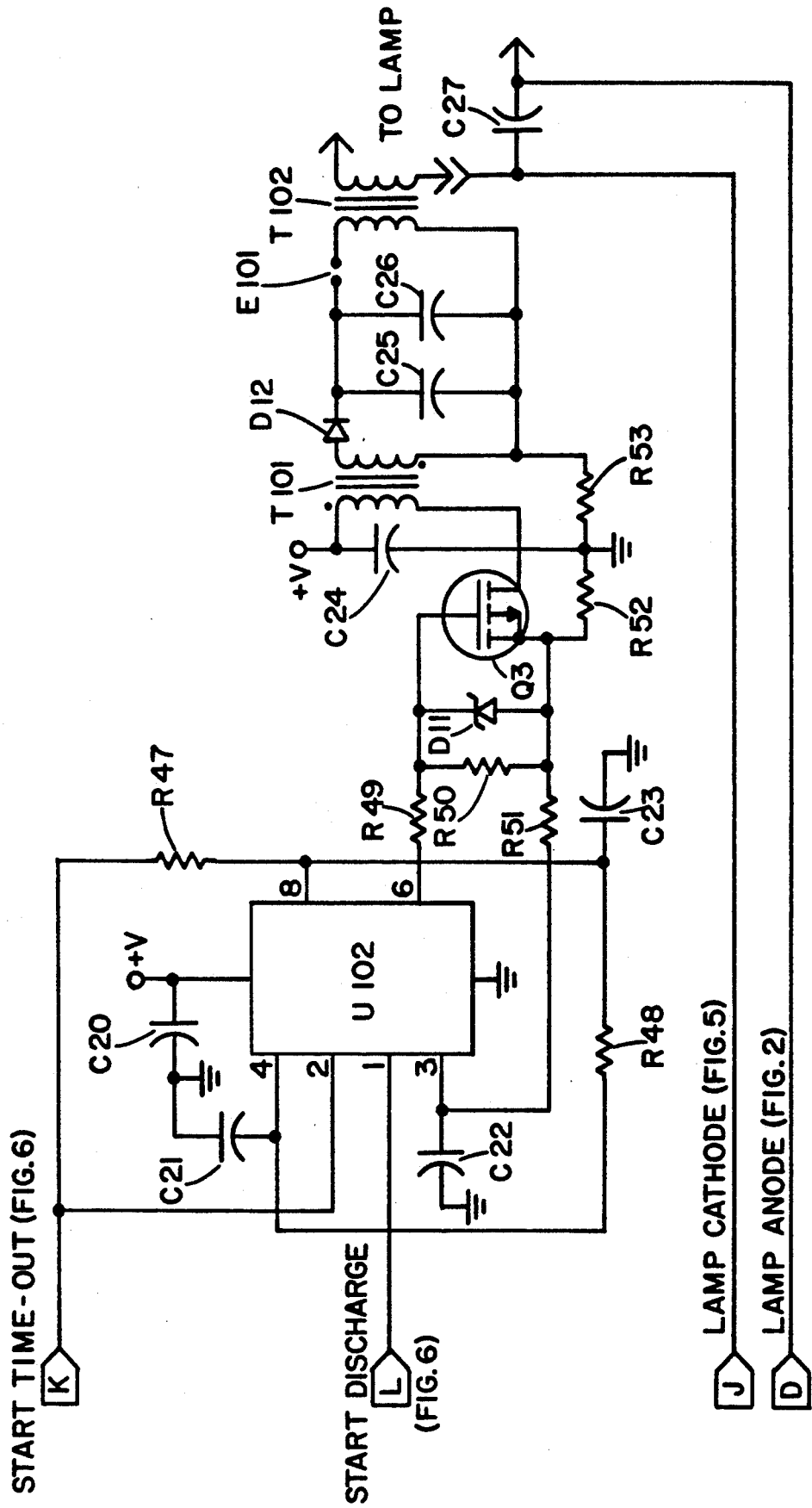
FIG. 7 is a schematic illustration of the starter circuit portion of the ballast arrangement of the present invention.

As seen in FIG. 7, the connection of run power to the lamp 20 during warm-up and steady state conditions as originates from the first boost converter circuit shown in FIG. 2, is connected over the lamp anode and lamp cathode lines to a coupling circuit consisting of capacitor C27 and the secondary winding of transformer T102. By this coupling arrangement, it can be seen that the lamp 20 is powered in a voltage fed manner rather than as a current fed device. As such, the inductance necessary to drive the lamp during warm-up and steady state conditions is substantially reduced in size and in inductive value. In the present application in which the run signal is provided with less than approximately 5% ripple, the low inductance of the secondary of transformer T102 is beneficial for insuring that the 6 amp, 20 volt run signal provided during warm-up conditions is readily achieved. Such may not be the case in a current fed configuration using a high inductance device where the high impedance of such inductor would make it difficult to achieve the 6 amp current needed during warm-up. Additionally, by maintaining the ripple content of the run signal of the present invention to such a low value, acoustic resonances that could adversely affect the operation of the lamp 20 can be prevented.

As previously discussed with respect to FIG. 6, the starter circuit of the ballast arrangement 10 is disabled by way of a start discharge signal generated upon a determination that the open circuit voltage of a certain value has occurred. The start discharge signal is coupled to the disabling input (pin 1) of a second pulse width modulator PWM device U102 which controls the operation of the second boost converter circuit associated with the starting operation. The second PWM device of the second boost converter circuit begins operation upon initially energizing the ballast circuit 10 of the present invention. The second boost converter circuit further includes a second power switching device Q3 which is gated by the output of the second PWM device U102 and is effective for generating starting pulses to the lamp 20 of up to 30 KV with a repetition rate of about 250 pulses per second and a pulse width of about 50 nanoseconds. The second boost converter circuit also includes diode D12 and transformer T101 and is effective for providing at least 1000 volts to the spark gap circuit which consists of spark gap device E101, and capacitors C25 and C26. At 1000 volts, the spark gap device E101 fires and discharges capacitors C25 and C26 through transformer T102 to develop the starting pulses previously described. The high frequency pulsed operation of the second boost converter circuit is effective such that the capacitors C25 and C26 can be rapidly charged and if need be, recharged in a short period of time (approximately 6 milliseconds) in order to allow for a repeated attempt at starting the lamp if the previous attempt has failed. By this pulse frequency, the starter circuit of the present invention can be restruck a number of times in the same time period that it would take a starter circuit using a conventional approach.

Although the hereinabove described embodiment constitutes a preferred embodiment of the invention, it can be appreciated that modifications can be made thereto without departing from the scope of the invention as set forth in the appended claims.

We claim:

1. A low voltage DC input ballast circuit for a discharge lamp comprising:
   input filter means for receiving and filtering said low voltage DC input such that a conditioned signal is produced thereby;
   first boost converter circuit receptive of said conditioned DC signal, said first boost converter circuit having a first power switching device which is effective upon introduction of a control signal thereto, such that a run signal having a predetermined amplitude and frequency is produced from said conditioned DC signal;
   control circuit means coupled to said discharge lamp for receiving a sample of at least one of a voltage and a current operating characteristic of said discharge lamp and developing said control signal as a function thereof;
   output coupling circuit having said run signal connected as an input thereto, said output coupling circuit being connected to said discharge lamp so that said run signal is fed to said discharge lamp as a voltage during steady state operating conditions; and
   starting circuit arrangement connected to said output coupling circuit and effective during initial on conditions of said discharge lamp so as to develop a high voltage pulse across said output coupling circuit, said high voltage output pulse being effective to cause ionization of the ingredients of said discharge lamp and thus the starting thereof, said starting circuit arrangement being effective so as to repeat said high voltage pulse in less than 10 milliseconds in the event that said discharge lamp fails to start as a result of the preceding high voltage pulse.

2. The ballast circuit as set fort in claim 1 wherein said starting circuit arrangement includes a second boost converter circuit arrangement having a second power switching device capable of generating said high voltage pulse having a predetermined amplitude and frequency.

3. The ballast circuit as set forth in claim 1 wherein said control circuit means outputs a disable signal to said starting means upon detecting that a discharge has started in said discharge lamp.

4. The ballast circuit as set forth in claim 1 wherein said control circuit means includes a time-out circuit arrangement whereby, during periods immediately following removal of power from said discharge lamp, warm up power of a magnitude larger than steady state power, is applied to said discharge lamp for a duration variable as a function of the period of time for which steady state power to said discharge lamp was removed.

5. The ballast circuit of claim 4 wherein said time-out circuit includes a logic device having a high impedance input and a resistor, capacitor tuning circuit connected to said high impedance input of said logic device such that in the event power is removed from said ballast circuit, said resistor capacitor tuning circuit times out in an exponentially decreasing manner.

6. The ballast circuit as set forth in claim 1 wherein said control circuit means further includes a fade circuit arrangement effective, upon detection of a drop in said DC input below a predetermined value, for clamping the current supplied to said discharge lamp to a predetermined value.

7. A low voltage DC input ballast circuit for a discharge lamp comprising:
   a power converter circuit having an input filter stage receptive of said low voltage DC input and having as an output thereof, a filtered DC signal, said power converter circuit further including a boost converter stage receptive of said filtered DC signal, said boost converter stage being effective so as to produce a run signal from said filtered DC signal, said run signal having a predetermined amplitude and frequency selected so as to operate said discharge lamp between a warm-up condition and a steady state condition, said amplitude and said frequency of said run signal being determined as a function of a control signal coupled to said boost converter stage;
   control circuit means coupled to said discharge lamp for receiving a sample of at least one of a voltage and a current operating characteristic of said discharge lamp and developing said control signal as a function thereof;
   output coupling circuit having said run signal coupled as an input thereto, said output coupling circuit being connected to said discharge lamp so that said run signal is fed to said discharge lamp as a voltage during such steady state operating conditions;
   starting means connected to said output coupling circuit effective prior to such lamp warm-up condition for developing a high voltage pulse across said output coupling circuit, said high voltage pulse being effective to cause ionization of the ingredients of said discharge lamp and thus the starting thereof; and;
   said control circuit means including timer means for sensing a time period for which power to said discharge lamp has been removed and adjusting said run signal so as to achieve a warm-up power level higher than the power level to said discharge lamp during steady-state operation, said timer means being effective for adjusting such warm-up power level according to how long power to said discharge lamp has been removed, said timer means further including a timer circuit having an output coupled to a high impedance device such that said timer circuit discharges in an exponential manner even during power off conditions.

8. The ballast circuit as set forth in claim 7 wherein said starting means includes a second boost converter circuit arrangement having a second power switching device effective so as to generate said high voltage pulse having a predetermined amplitude and frequency.

9. The ballast circuit as set forth in claim 7 wherein said control circuit means outputs a disable signal to said starting means upon detecting that a discharge has started in said discharge lamp.

10. The ballast circuit as set forth in claim 7 wherein said output coupling circuit includes a capacitor and a transformer having a primary and a secondary winding and wherein, during said warm-up and said steady-state conditions, said run signal is connected only to said capacitor and said secondary winding of said transformer whereas during a lamp starting operation, starter pulses from said starting means are connected to said primary winding of said transformer so that said high voltage pulses can be generated across said secondary winding of said transformer.

11. The ballast circuit as set forth in claim 10 wherein said starting means includes a second boost converter circuit having a second power switching device controlled by means of a gate signal generated by a pulse width modulator associated with said starter means, said second boost converter being effective so that said starter pulses can be generated in less than 20 milliseconds and regenerated if necessary within a next 20 millisecond period.

12. A ballast circuit arrangement for a discharge lamp comprising:

an input power conditioning circuit receptive of input power and effective for producing a conditioned power signal therefrom;

boost converter circuit receptive of said conditioned power signal and effective for developing therefrom, a run signal for driving said discharge lamp to a discharge state, said boost converter circuit developing said run signal to at least one level of magnitude and frequency as a function of a control signal coupled to said boost converter circuit;

control circuit means coupled to said discharge lamp so as to receive a sample of at least one of a voltage and a current operating characteristic of said discharge lamp and develop said control signal as a function thereof;

output coupling circuit having said run signal connected as an input thereto, said output coupling circuit being connected to said discharge lamp so as to couple said run signal thereto, said output coupling circuit coupling said run signal to said discharge lamp in a voltage fed manner; and wherein said control circuit means includes a fade circuit effective, upon detection of a drop in said input power below a predetermined level, for clamping the current supplied to said discharge lamp to a predetermined value.

13. A ballast circuit arrangement for a discharge lamp comprising:

an input power conditioning circuit receptive of input power and effective for producing a conditioned power signal therefrom;

boost converter circuit receptive of said conditioned power signal and effective for developing therefrom, a run signal for driving said discharge lamp to a discharge state, said boost converter circuit developing said run signal to at least one level of magnitude and frequency as a function of a control signal coupled to said boost converter circuit;

control circuit means coupled to said discharge lamp so as to receive a sample of at least one of a voltage and a current operating characteristic of said discharge lamp and develop said control signal as a function thereof;

output coupling circuit having said run signal connected as an input thereto, said output coupling circuit being connected to said discharge lamp so as to couple said run signal thereto;

wherein said control circuit means includes a time-out circuit arrangement whereby, during periods immediately following removal of said input power conditioning circuit, a warm-up power level of a magnitude greater than power to said discharge lamp during steady state conditions, is applied to said discharge lamp for a duration variable as a function of the period of time for which steady state power to said discharge lamp was removed; and wherein said time-out circuit arrangement includes a logic device having a high impedance input and a resistor, capacitor tuning circuit connected to said high impedance input of said logic device such that, in the event input power to said ballast circuit arrangement is removed, said resistor, capacitor tuning circuit continues to time out in an exponentially decreasing manner.

* * * * *